(12) United States Patent
Maison et al.

(10) Patent No.: US 9,430,059 B2
(45) Date of Patent: Aug. 30, 2016

(54) MULTI-USER POINTING APPARAUS AND METHOD

(76) Inventors: Benoit Maison, Wavre (BE); Xavier Sohy, Falmignoul (BE); Olivier Pierre, Saint Jean la Poterie (FR); Matthieu Laheux, Ligron-Thouars (FR)

(*) Notice: Subject to any disclaimer, the term of this patent is extended or adjusted under 35 U.S.C. 154(b) by 2010 days.

(21) Appl. No.: 12/309,784

(22) PCT Filed: Aug. 2, 2006

(86) PCT No.: PCT/EP2006/064987
§ 371 (c)(1),
(2), (4) Date: Jan. 29, 2009

(87) PCT Pub. No.: WO2008/014819
PCT Pub. Date: Feb. 7, 2008

(65) Prior Publication Data
US 2009/0315829 A1    Dec. 24, 2009

(51) Int. Cl.
G06F 3/0346    (2013.01)
G06F 3/0354    (2013.01)
G06F 3/038     (2013.01)

(52) U.S. Cl.
CPC ......... *G06F 3/03545* (2013.01); *G06F 3/0386* (2013.01)

(58) Field of Classification Search
None
See application file for complete search history.

(56) References Cited

U.S. PATENT DOCUMENTS

| | | | |
|---|---|---|---|
| 5,726,685 A | * | 3/1998 | Kuth et al. ................. 345/173 |
| 7,273,280 B2 | * | 9/2007 | Smoot et al. ................. 353/30 |
| 2006/0072076 A1 | | 4/2006 | Smoot et al. | |

FOREIGN PATENT DOCUMENTS

DE      103 8 981 A1     9/2004
WO    WO 00/72930 A    12/2000

OTHER PUBLICATIONS

Oh J-Y et al., "Laser Pointers as Collaborative Pointing Devices," Proceedings Graphics Interface, 2002, Calgary, Alberta, Canada, May 27, vol., pp. 141-149, XP001232467.
International Search Report—PCT—for PCT/EP2006/064987, by ISA-EPO, dated Apr. 27, 2007.

* cited by examiner

*Primary Examiner* — K. Wong
(74) *Attorney, Agent, or Firm* — Fisher Technology Law; Daniel E. Fisher

(57) ABSTRACT

An apparatus for interaction of a plurality of users with an application, comprising: a plurality of pointing devices (10) capable of emitting a signal (80; 110) (such as visible or infrared light, a laser or omnidirectional flashes), each pointing device comprising one or more triggers; a presentation device (20) (such as display, a wall, or any objects); and detection means (30) (camera, stereo camera, other) capable of detecting said signal (80; 110). The apparatus also comprises means (30, 40) for detecting trigger actions by said users, and recording the identity and time of said trigger actions (30, 40), means (40, 13) for enabling said pointing devices (10) to emit said signal (80; 110) and means (40) for enabling said detection means (30) to detect said signal (80, 110), and for linking said signal detection to a specific pointing device (10) trigger action.

10 Claims, 6 Drawing Sheets

FIRE REQUEST / LASERS IDENTIFICATION - REQUESTS QUEUING

"FIRE GRANT" DISPATCHING – LASER LIGHT BEAM EMISSION

"FIRE GRANT" DISPATCHING – LASER LIGHT BEAM EMISSION

"FIRE GRANT" DISPATCHING

"FIRE GRANT" DISPATCHING

MULTI-USER POINTING APPARAUS AND METHOD

TECHNICAL FIELD

The invention relates to multi-user interaction in a groupware collaborative environment and, more particularly, to an apparatus and method for identifying and tracking multiple user pointers simultaneously as well as recognizing button press events from these multiple user pointers.

DESCRIPTION OF RELATED ART

Large display systems are widely and increasingly used for everyday use in modern information technology at work, at home, in public locations or in game set-ups. Most of them are non-interactive and they do not enable users to directly manipulate or take control of objects displayed on a screen. Typically, in a large screen interactive environment, the main idea is to augment display with appropriate interactive capabilities. Such devices as mice and keyboards, in that case, are not suitable since, for example, they require a horizontal surface to work on. Moreover, input devices are typically created to be used by single users and to enable, consequently, only single user interaction. All the above limitations are particularly relevant in groupware applications.

Recently, various input devices have been developed to overcome the above limitations. The alternatives to mouse and keyboard comprise therefore: light or electronic pens; sensitive panels; gesture and speech recognition systems; laser pointers; and, more generally, wireless handheld input devices (WHID). Actually, given the high costs of large sensitive panels and the low reliability of gesture and speech recognition systems, the interaction solution is often limited to laser pointers or other WHID.

One of the main challenges in computer graphics today is to enable group collaboration using input devices. Such devices must be useful for collaboration, scalable to support multiple persons and capable to guarantee social interaction for cooperative tasks in such situations as multi-player game set-ups; presentation sessions; brainstorming sessions of a design application; planning sessions for rescue efforts . . . . More generally, in collaborative work environments, it might be possible to attribute any action to a specific participant, and in some applications, also to allow each user to control a specific set of on-screen widgets.

PRIOR ART DISCUSSION

The document "Laser Pointers as Collaborative Pointing Devices" (http://www.cs.yorku.ca/~wolfgang/papers/multi_laser.pdf), by Ji-Young Oh and Wolfgang Stuerzlinger, discloses a system which uses laser pointers as input devices and a method to detect and identify multiple laser pointers in a single display groupware environment. The system is capable of identifying and distinguishing between different laser pointers, by using different blinking patterns for each laser pointer. More particularly, in the technique herein presented, each laser pointer is turned "on" and "off" according to a repeated pattern, and with the help of a Kalman filter, the system predicts the position of each input device for subsequent periods. Nevertheless, the technique herein discussed presents the disadvantage that the laser pointing devices identification fails when overlaps occur in the blinking patterns of the laser pointers. Moreover, for applications involving many users (30 or more), the length of the pattern necessary for discriminating the different pointers could make the follow-up cycle too slow. As a consequence, the system and method herein disclosed do not support a large number of users. Moreover, the pure scope of the research, herein disclosed, is to provide a system and method for following and knowing each laser pointer position, continuously in time.

The document "uPen: Laser-based, Personalized, Multi-user Interaction on Large Displays" by Xiaojun Bi, Yuanchun Shi, Xiaojie Chen, PeiFeng Xiang, (http://media.cs.t-singhua.edu.cn/~bxj/ForMM05.pdf), discloses a multi-user pen-like interaction device for interacting on large displays collaborative environment, or directly writing on a touch-sensitive board. In this document, when a laser stroke appears on the screen, a camera follows up and associates it to the corresponding uPen identifier. By means of a Kalman filter, the system herein disclosed updates continuously each laser stroke device identity. This system requires a continuous follow-up of each stroke, and it would fail when a laser stroke disappears temporarily from the screen, when the camera captures more laser strokes which are simultaneously projected by users onto the screen, or even when more laser strokes are in close proximity to each other. As a consequence, the system herein described can not distinguish a large number of users which interact simultaneously on a large display interaction environment.

Another technique for tracking and identifying multiple laser pointers in a large screen collaborative environment is presented in the document "Tracking Multiple Laser Pointers for Large Screen Interaction" (http://hct.ece.ubc.ca/publications/pdf/vogt-etal-uist2003.pdf) by Florian Vogt, Justin Wong, Sidney S. Fels and Duncan Cavens. The approach described in this document, for identifying and distinguishing asynchronously each laser pointer, is to decode the blinking pattern of each laser pointer over consecutive sequences of video frame captured by a camera. Nevertheless, laser pointers recognition fails when overlaps occur in the blinking patterns, and the system, consequently, does not support a large number of participants and offers limited reliability.

Another example of input device for multi-user interaction in a large screen collaborative environment, is the Magic-Y™ system (http://www.barco.com/Edutainment/en/products/product.asp?element=125 5) developed by BARCO. This is a multi-user input device to be used especially in informal learning environment. The Magic-Y™ allows participants to point, drag, rotate, and modify objects in one or more screens. Nevertheless its configuration does not allow the system to distinguish and identify multiple participants.

U.S. Pat. No. 6,456,276 discloses an apparatus and method for recognizing one pointing device position in a video display system with remote controller. In this document a plurality of optical sensors computes the position of the remote controller continuously in time. The system and method herein disclosed support only single user interaction. Moreover, the document does not disclose any button press events recognition.

Patent application US 20050260986 discloses a system and method for remotely controlling the computer of an interactive image projection display system by means of a visual input pointing device. Once more this system and method support only single user interactions configuration and no button press events recognition is disclosed.

SUMMARY OF THE INVENTION

The present invention aims to overcome the above-discussed disadvantages of the prior art. It is an object of the present invention, therefore, to provide an apparatus and a method for detecting and identifying multiple pointing devices. More specifically, the present invention aims to provide an apparatus and a method for enabling multi-user interaction in a groupware collaborative environment with press button events recognition.

According to a first aspect of the invention, an apparatus is provided for interaction of a plurality of users with an application. The application may be a video application. This apparatus comprises a plurality of pointing devices, each capable of emitting a signal. The signal may either be a beam of laser, visible or infrared light, or an omnidirectional flash. Each pointing device comprises one or more triggers that can be activated by the users by e.g. pressing a button. A scene is displayed on a presentation device such as a display or a wall but any other object can be part of the presentation device. Detection means such as camera or a pair of stereo cameras is capable of detecting said signal. The apparatus also comprises means for detecting trigger actions by the users, and recording the identity and time of said trigger actions, means for enabling said pointing devices to emit their signal (said signal being either the emission of a beam, of the emission of a beam of higher, detectable intensity, or a plurality of omnidirectional flashes), and means for enabling said detection means to detect said signal, and for linking said signal detection to a specific pointing device trigger action, all said means comprising a computer system.

In a first embodiment of the invention, the signal is a beam emitted by the pointing device. The beam may be emitted towards said presentation device, thereby determining a distinguishable beam dot on said presentation device.

Preferably, the detection means is a video camera directed towards said presentation device and detects the position of said distinguishable beam dot on said presentation device.

In a second embodiment of the invention, the detection means is a video camera directed towards said pointing devices and the pointing devices comprise means allowing said video camera to detect the orientation of said pointing devices.

Preferably, said means allowing said video camera to detect the orientation of said pointing devices are the provision of said pointing devices with a plurality of omnidirectional light sources.

A second camera may also be provided, cooperating with the first camera and providing a stereo vision for detecting the orientation of said pointing devices.

According to a second aspect of the invention, a method is provided for recognizing trigger actions of users of pointing devices (L1, L2, . . . Li, . . . Ln), said pointing devices emitting a signal, in a groupware collaborative environment. The method comprises the steps of
  receiving a plurality of fire request signals from said pointing devices;
  recording the identity and time of said fire request signals in a queue of recorded fire request signals (A1, A2, . . . , Ai, . . . , An);
  selecting a recorded fire request signal from said queue;
  sending a fire grant signal to the pointing device corresponding to the recorded fire request signal which was selected from the queue;
  enabling said corresponding pointing device to emit a signal in response to said fire grant signal;
  detecting said emitted signal and linking said signal with said pointing device.

In the first embodiment of the invention, the step of detecting said emitted signal is performed by directing a video camera towards a presentation device and by detecting a distinguishable beam spot emitted by said pointing device on said presentation device.

In the second embodiment of the invention, the step of detecting said emitted signal is performed by directing a video camera towards said pointing devices, by providing said pointing devices with a plurality of omnidirectional light sources, and by detecting thereby the orientation of said pointing device.

The linking step of the method of the invention may be performed using a dynamic programming algorithm such as the Viterbi algorithm or an extended Levenshtein algorithm;

According to a last aspect of the invention, one or more computer-readable media are provided having stored thereon a computer program for performing the method and/or for using the apparatus of the invention.

DETAILED DESCRIPTION OF THE INVENTION

Figure 1:
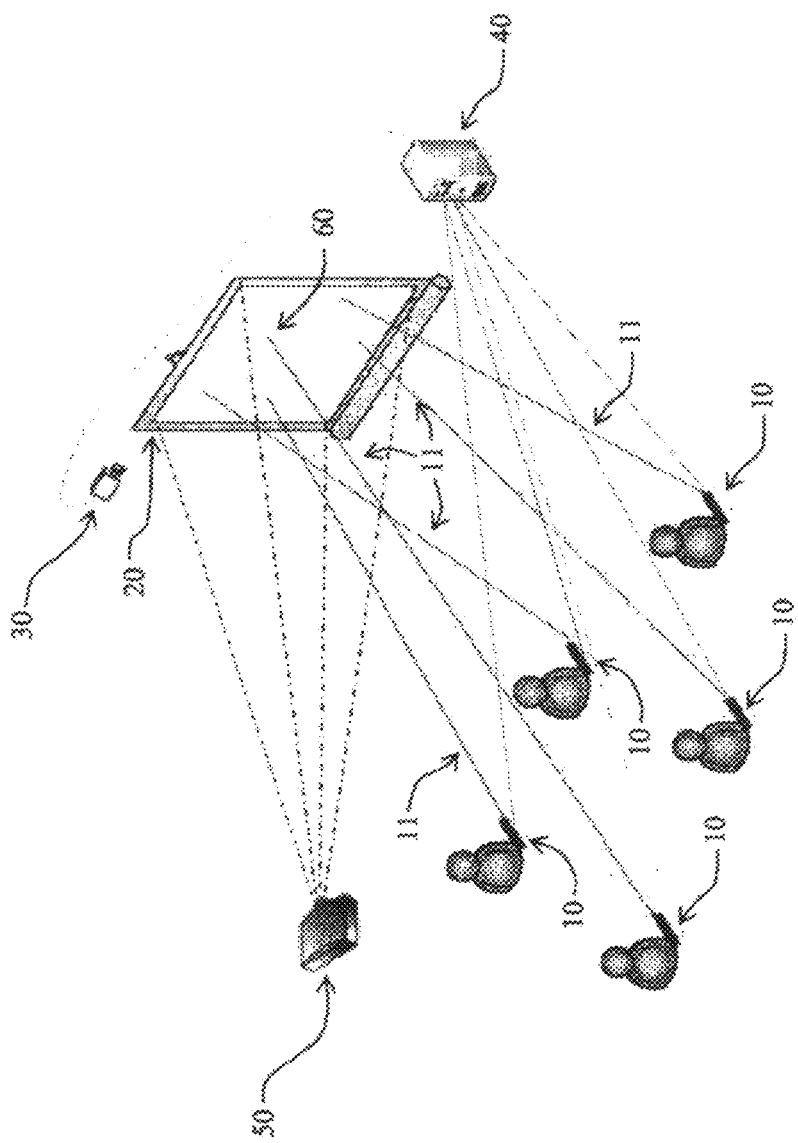
FIG. 1 is a schematic view of a multi-user interaction system according to an embodiment of the invention, embedded in its environment.

FIG. 1 shows a preferred embodiment of the invention wherein a multi-user interaction environment system is provided. In this embodiment of the invention, each user wields a pointing device 10 that can emit a beam 11 (visible light, infrared light, laser or other) for a preset duration. The pointing device 10 is further fitted with one or more triggers, such as buttons. The invention also comprises: a physical object 20, which could be, for example, a large-size display or a simple wall, or other objects; a high-speed video camera 30, which could be alternatively a stereoscopic camera; a processing computer 40, such as a PC; and a projector 50. An interactive video application is projected by projector 50 on display 20, and users may interact with the application by aiming their pointing device 10 towards a specific area on the display, and pressing the trigger of their pointing device 10. The physical object 20 could also be a plasma display panel. The high-speed video camera 30 detects said beam 11 (visible light, infrared, laser, or other, depending on the pointing device type), and it is pointed towards the area 60 of the physical object 20 where users point at. The camera 30 and the pointing devices 10 are connected to the processing computer 40. The connection may be a wired or wireless connection. On the one hand, the connection between the video camera 30 and the processing computer 40 allows the latter to digitally acquire the image captured and recorded by the camera 30; on the other hand, the connections between the pointing devices 10 and the processing computer 40 have two purposes as follows: transmitting a "fire request" from a pointing device 10 to the processing computer 40 as a result of a user on/off button press event; and transmitting a "fire grant" from the computer 40 to the pointing device 10.

Figure 2:
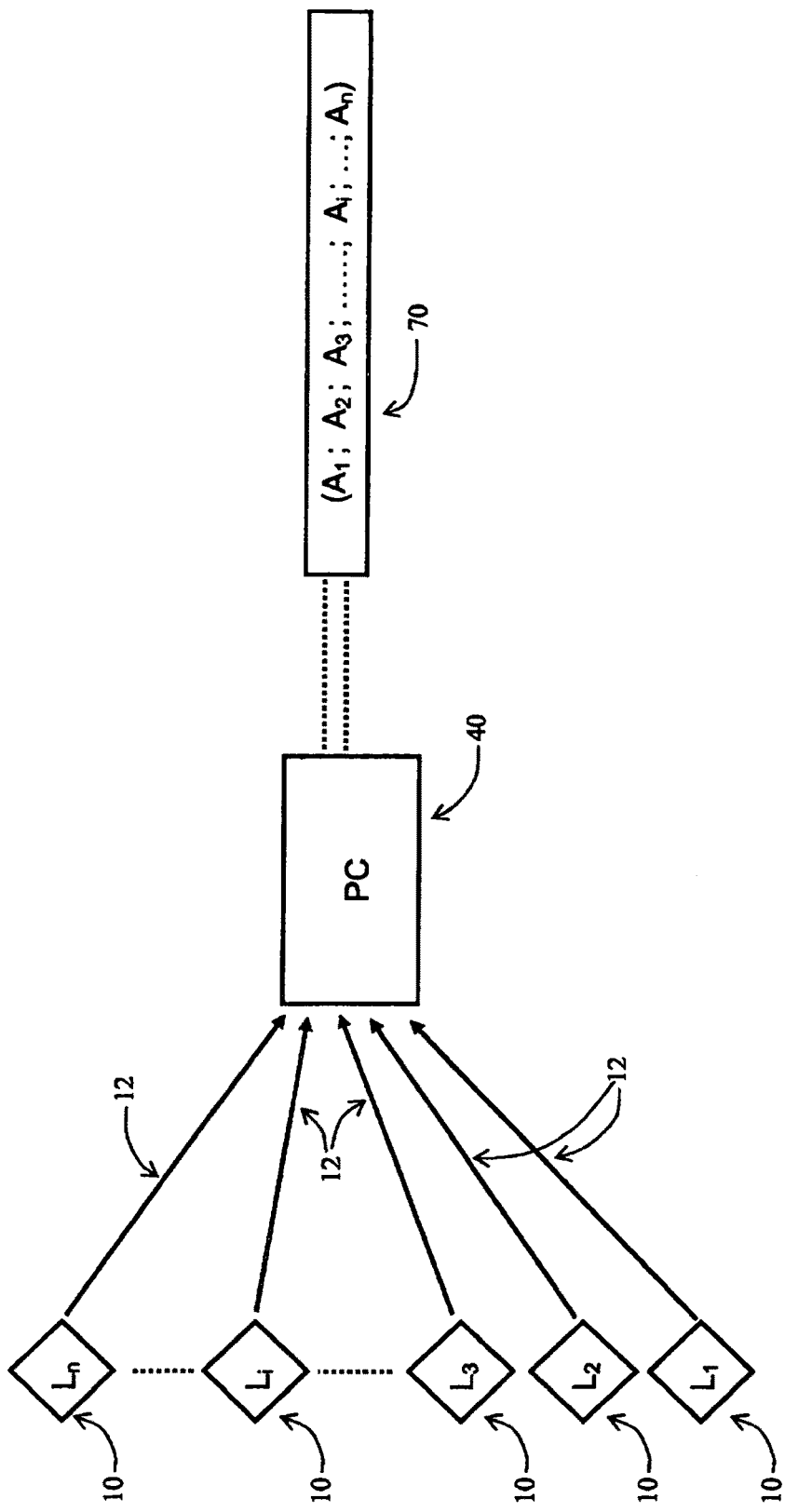
FIG. 2 is a partial flowchart diagram of a method according to the invention showing the steps of receiving fire request signals and recording these signals in a queue.

Referring now to FIG. 2, a plurality ($L_1, L_2, \ldots, L_n$) of pointing devices 10 may generate simultaneous or nearly simultaneous trigger actions. When a user presses the trigger of his pointing device 10, a "fire request" signal 12 (carrying the identity of the corresponding pointing device) is sent from pointing devices 10 to the computer 40. Before the beam is emitted by this pointing device 10, the processing computer 40 identifies each pointing device 10 from which the corresponding signal 12 arrives and elaborates said signals 12, creating a queue 70 of fire requests ($A_1$, $A_2, \ldots, A_n$) in chronological order.

Figure 3:
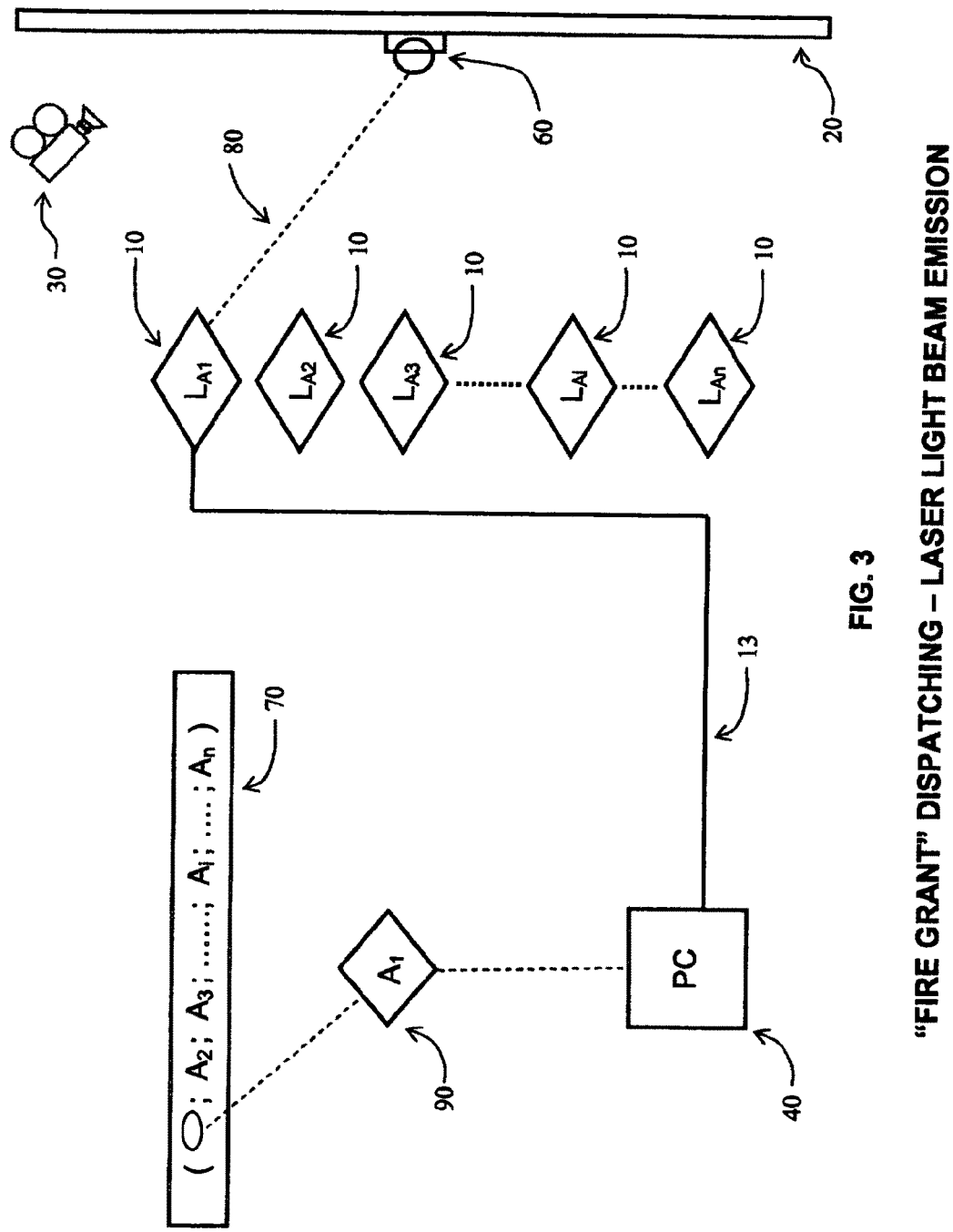
FIG. 3 and FIG. 4 are flowchart diagrams of a method according to a first embodiment of the invention showing the steps of selecting a first, respectively subsequent fire request signal from said queue, sending a fire grant signal to the corresponding pointing device, emitting a distinguishable beam, and detecting said beam.
Figure 4:
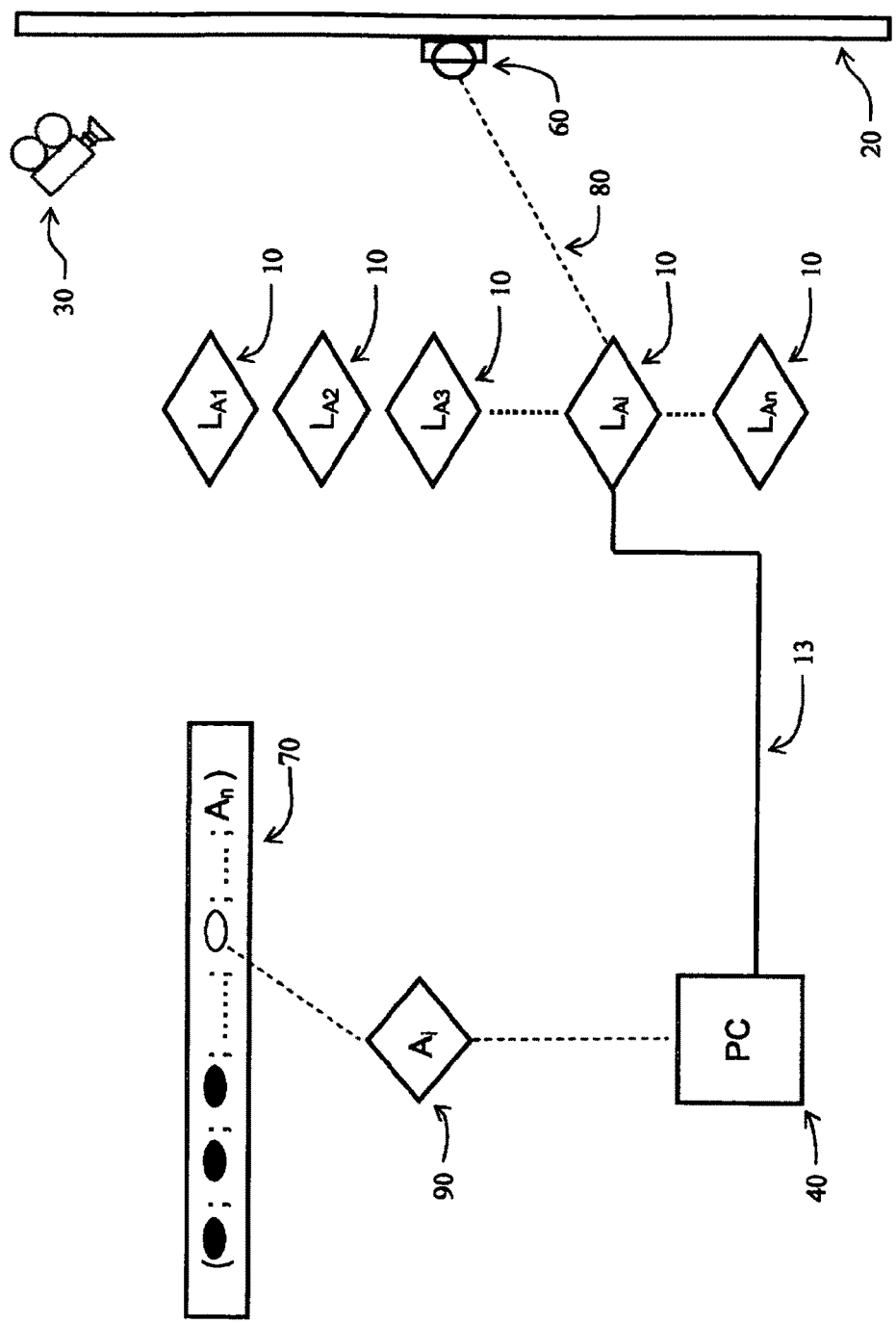

Referring now to FIG. 3 and FIG. 4, at regular intervals the computer 40 fetches a request 90 from the queue 70, and dispatches a "fire grant" signal 13 to the corresponding pointing device 10. When said corresponding pointing device 10 receives the "fire grant" signal 13 from the processing computer 40, it emits a beam 80 towards the area 60 of the physical object 20 for example by switching from off to on, for a preset duration in such a way that said beam disappears from the area 60 of the physical object 20 before the following pointing device 10 emits its own beam by receiving the next fire grant. In the images captured the camera 30 detects a beam dot 80, which is the intersection point of said beam 80 and the area 60 of the physical object 20. When the pointing device 10 emits an infrared light then an infrared (high speed or not) camera is used. Beam dots 80 are detected by thresholding the image captured by said infrared camera, optionally removing dots either less than a minimum size, or greater than a maximum size and optionally computing the center of the dots. When the pointing device 10 emits a visible light, a regular high speed camera is used. Since beam dots 80 appear superimposed on the image displayed onto the screen, all the image differences are used to detect the appearance and disappearance of said beam dots 80. In this case, the frame rate of the camera must be higher than the frame rate of the display. Camera images that coincide to display image changes are discarded (since the entire image changes, not just the dot locations). Optionally, if a color camera is used, the specific color of the laser can be searched for in the camera image, in addition to the dots detection using image differences.

It should be noted that in the present invention the above discussed queuing mechanism ensures that only one beam dot 80 appears at a time in the physical object 20. Hence, it is possible to match the location of the beam dot 80 with the pointing device 10 from which said beam dot 80 is emitted, by simply matching the sequence of "fire grant" events created by the computer 40 with the sequence of "detected dot" events captured by the camera 30.

In a variant of the previous embodiment, each pointing device 10 is switched off after a preset length of time. If, instead of a single trigger action, the user keeps the trigger pressed for a long duration, the above discussed procedure starts anew, with a fire request signal 12, queuing, a fire grant signal 13, and a new switching-off for the same length of time, and is repeated during the duration of the trigger press. A different fire request signal 12 may be used to distinguish a continuous activation of the trigger from a sequence of press/release in short order.

In a second variant of this embodiment, each pointing device 10 is not switched off if the user keeps the trigger pressed, but the procedure is started when the user releases the trigger: fire request signal 12, queuing mechanism (in a separate queue), fire grant signal 13, beam activation. Alternatively, if the laser remains on for the duration of the trigger activation, it is necessary to track the light dots in the image with a tracking process. This is realized with well-known object tracking techniques (Kalman, Particle filtering, Data association, etc.) based on the location of the dots in successive images.

FIG. 5/6

Figure 5:
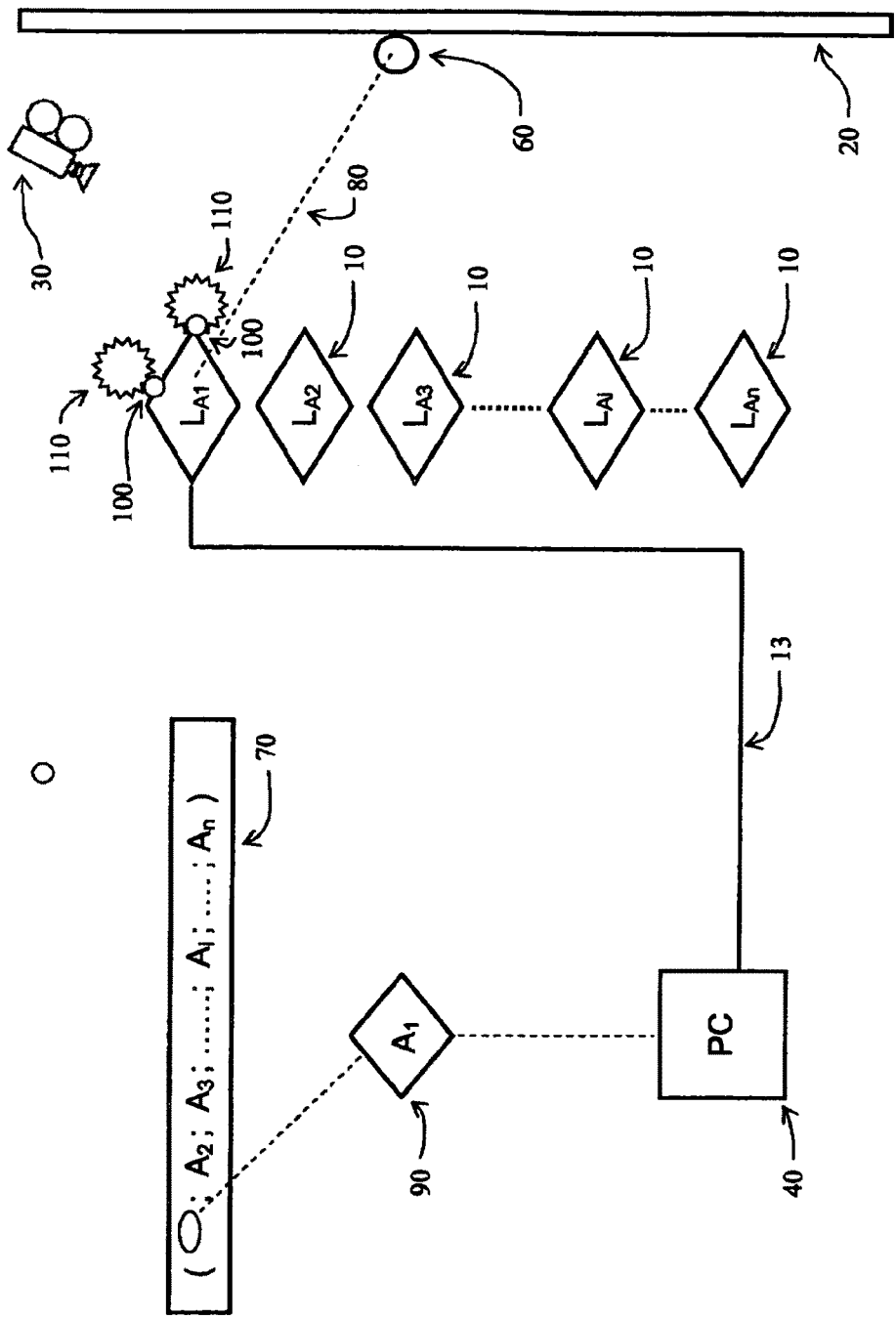
FIG. 5 and FIG. 6 are flowchart diagrams of a method according to a second embodiment of the invention.
Figure 6:
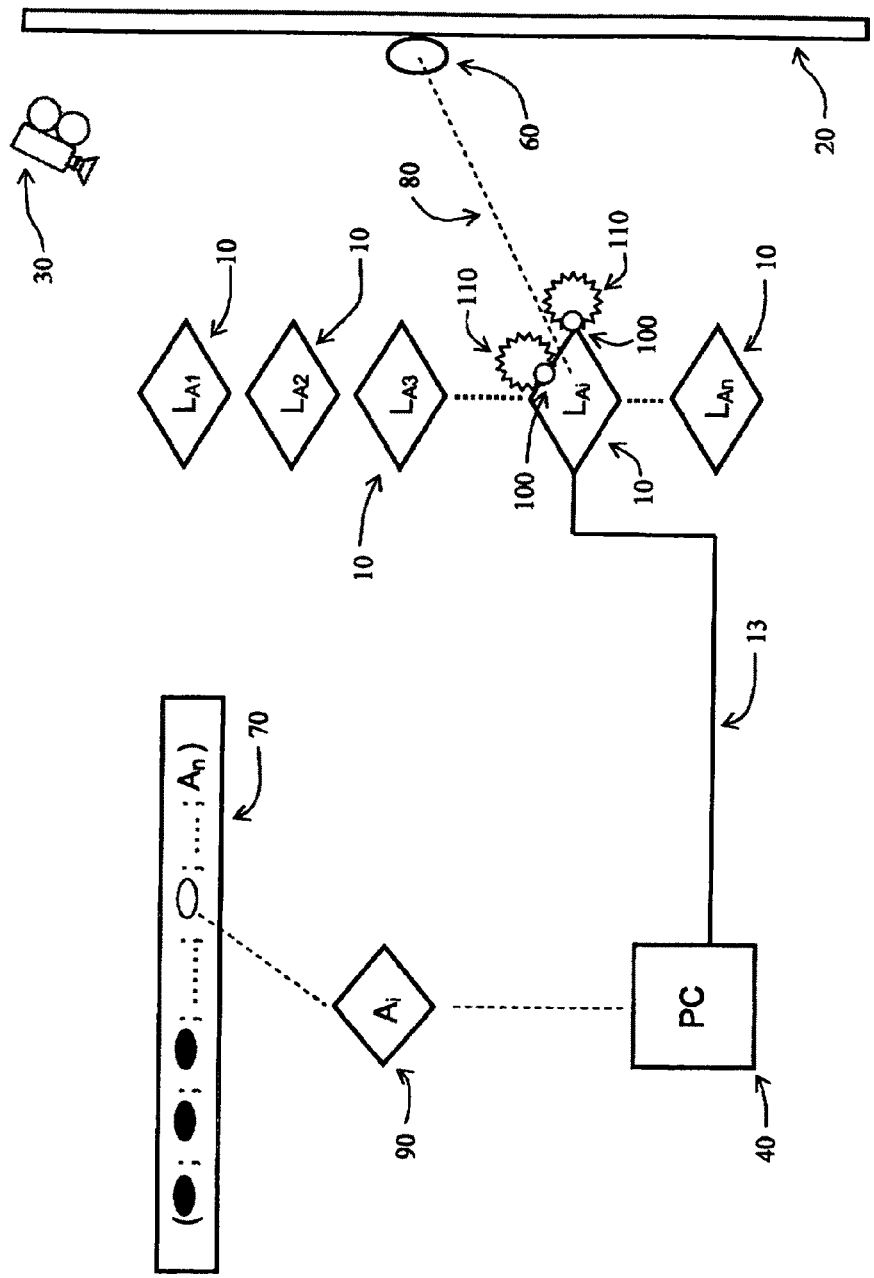

FIG. 5 and FIG. 6 show another embodiment according to the invention. In this embodiment the exact same procedure as in the previous one is followed, but in contrast with the previous one, the camera 30 is directed towards the pointing devices 10. Each pointing device 10 is additionally provided with a plurality of omnidirectional beam sources 100 each emitting omnidirectional light flashes 110 (for example, visible light or infrared). The fire grant signal 13 from the computer 40 causes the beam sources 100 on the pointing device 10 to emit omnidirectional light flashes 110 which are detected by the camera 30. The position and orientation of the pointing device 10 is then computed from the position of the omnidirectional beam sources 100 in the image captured by the camera 30 and from the known location of said omnidirectional beam sources 100 on the pointing device 10 by solving a system of equations. It should be noted that, in case of a video camera, pointing devices 10 must be provided with at least four omnidirectional beam sources 100; instead if a stereoscopic camera is used, to obtain a higher accuracy, then in that case pointing devices 10 must be provided with at least two omnidirectional beam sources 100. The orientation of the pointing device 10 and the known geometry of the scene permit then the computer 40 to compute the location of the point in the area 60 of the physical object 20 towards which the user directs the pointing device 10.

Each time a cycle of fire request 12, queuing mechanism, and fire grant signal 13 is realized, the process produces on the one hand a fire grant signal 13 sequence ($FG_1$, $FG_2, \ldots, FG_i, \ldots, FG_n$) (sequence of trigger activation events) with known time stamps; and on the other hand a sequence of beam dot detection events ($D_1, D_2, \ldots, D_i, \ldots, D_n$), also with known times. The times measurements may be less precise than the absolute times of the events, because they are multiples of the acquisition period of the camera, which is usually longer than the acquisition time of the simple electric signals of the first sequence. Further, the time references of these two sequences may be slightly different. It is therefore not possible to rely only on the absolute time of events. In order to overcome this problem, the time intervals between subsequent events are used in addition to the absolute times of the events. The objective is to pair the events of each sequence, even when an event from the first sequence ($FG_1, FG_2, \ldots, FG_i, \ldots, FG_n$) has no match in the second one ($D_1, D_2, \ldots, D_i, \ldots, D_n$), (when, for example, a user points outside the area 60, or a beam dot is not detected properly, etc. . . . ), or when an event from the second sequence has no match in the first one (when, for example, spurious beam dots 80 are detected due to camera noises, or due to interferences with image projector etc.). For this purpose the time values are computed by using dynamic programming techniques (e.g. the Viterbi algorithm, or an extended Lovenshtein algorithm) which minimize a cost function by taking into account the absolute event times and the time intervals between subsequent events. Those techniques will match then the two sequences of events, while allowing for missing events (gaps) in both sequences. Successful matches are also used to estimate the discrepancy between the time references of sequences ($FG_1, FG_2, \ldots, FG_i, \ldots, FG_n$) and ($D_1$, $D_2$, ..., $D_i$, ..., $D_n$). The discrepancy between time differences can also be set or initialized during a calibration phase.

The examples of FIGS. 3, 4, 5 and 6 respectively show an embodiment where the elements A1, A2, ..., An are processed sequentially in the queue 70 (First-In-First-Out processing). However, other strategies may be used for selecting an element Ai in the queue, depending on the needs of the application. For example, an element Ai may be selected alternatively from members of two different teams of players, or a player may be made inactive depending on game conditions.

The invention may be used in game parks, conference rooms, exhibition halls or other environments. For example, in a game setting, a scene is shown to a plurality of players on presentation device 20. Moving targets on the scene must be hit. Each player is provided with a weapon, which is a pointing device 10. By using the apparatus and method of the invention, one can detect multiple near-simultaneous trigger actions, and assign a hit or miss to the player who issued the action. In a groupware setting, the invention may be used for the interaction of multiple users with a software application. Users can direct their pointer to a screen, with their pointer emitting a low intensity beam. The users know where their pointer is directed to, and can precisely aim a specific area on the screen. By pressing the trigger of their pointing device, the apparatus enables the pointer to emit a distinguishable (higher intensity) beam, which is detected by the video camera 30. By using the apparatus and method of the invention, one can detect multiple near-simultaneous trigger actions, and know and record exactly who performed what action.

The invention claimed is:

1. An apparatus for interaction of a plurality of users with an application, comprising: a plurality of pointing devices (10) capable of emitting a signal (80; 110), each pointing device comprising one or more triggers; a presentation device (20); and detection means (30) capable of detecting said signal (80; 110); characterized in that it also comprises:
    a. means (30, 40) for detecting fire request signals transmitted from said pointing devices resulting from trigger actions by said users, and recording the identity and time of said trigger actions (30, 40);
    b. means (40, 13) for enabling said pointing devices (10) to emit said signal (80; 110);
    c. means (40) for enabling said detection means (30) to detect said signal (80; 110), and for linking said signal detection to a specific pointing device (10) trigger action.

2. The apparatus according to claim 1, characterized in that said signal (80; 110) emitted by said pointing (10) device is a beam (11).

3. The apparatus according to claim 2, characterized in, that said beam (11) is emitted towards said presentation device (20) thereby determining a distinguishable beam dot (80) on said presentation device (20).

4. The apparatus according to claim 3, characterized in that said detection means is a video camera (30) directed towards said presentation device (20) and detects the position of said distinguishable beam dot (80) on said presentation device (20).

5. The apparatus according to claim 1, characterized in that said detection means is a video camera (30) directed towards said pointing devices (1.0) and that said pointing devices (10) comprise means allowing said video camera (30) to detect the orientation of said pointing devices (10).

6. The apparatus according to claim 5, characterized in that said means allowing said video camera (30) to detect the orientation of said pointing devices (10) are the provision of said pointing devices (10) with a plurality of omnidirectional light sources (100).

7. The apparatus according to claim 6 characterized in that a second camera is provided, said second camera cooperating with said camera (30) for detecting the orientation of said pointing devices (10).

8. A method for recognizing trigger actions of users of pointing devices (10) ($L_1$, $L_2$, ... $L_i$, ... $L_n$), said pointing devices emitting a signal (80; 110), in a groupware collaborative environment, comprising the steps of:
    d. receiving a plurality of fire request signals (12) from said pointing devices (10) in response to one or more trigger actions by a user;
    e. recording the identity and time of said fire request signals (12) in a queue (70) of recorded fire request signals ($A_1$, $A_2$, ..., $A_i$, ... $A_n$);
    f. selecting a recorded fire request signal (12) from said queue (70);
    g. sending a fire grant signal (13) to the pointing device (10) corresponding to the recorded fire request signal (12) which was selected from the queue (70);
    h. enabling said corresponding pointing device (10) to emit a signal in response to said fire grant signal (13);
    i. detecting said emitted signal and linking said signal with said pointing device (10).

9. The method of claim 8 characterized in that the step of detecting said emitted signal (80; 110) is performed by directing a video camera (30) towards a presentation device (20) and by detecting a distinguishable beam dot (80) emitted by said pointing device (10) on said presentation device (20).

10. The method of claim 8 characterized in that the step of detecting said emitted signal (80; 110) is performed by directing a video camera (30) towards said pointing devices (10), by providing said pointing devices (10) with a plurality of omnidirectional light sources (100), and by detecting thereby the orientation of said pointing device (10).

* * * * *